United States Patent [19]

Ross

[11] 4,055,093
[45] Oct. 25, 1977

[54] 10-SPEED BICYCLES

[75] Inventor: Haldon Ross, Olney, Ill.

[73] Assignee: AMF Incorporated, White Plains, N.Y.

[21] Appl. No.: 697,314

[22] Filed: June 18, 1976

[51] Int. Cl.² .................. B62M 9/00; F16H 9/00; F16H 7/22

[52] U.S. Cl. .................. 74/501 R; 74/217 B; 74/242; 116/124 M

[58] Field of Search .................. 74/242, 217 B, 217 S, 74/217 C, 489, 527, 501, 501 R; 280/236, 261; 116/124 M

[56] References Cited

U.S. PATENT DOCUMENTS 3,901,095 8/1975 Wechsler .................. 74/217 B
3,965,763 6/1976 Wechsler .................. 74/217 B Primary Examiner—Samuel Scott
Assistant Examiner—Allan R. Burke
Attorney, Agent, or Firm—George W. Price; Walter Lewis

[57] ABSTRACT

The 10-speed bicycle has a single manually movable control member for all 10 speeds.

4 Claims, 9 Drawing Figures

10-SPEED BICYCLES

This invention relates to an improvement in 10-speed bicycles, and more particularly, to an improvement in the shift mechanism therefor.

Prior art 10-speed bicycles or bikes have a pair of shift handles for the front and rear derailleur mechanisms. In order to shift through all 10 speeds it is necessary to operate either one or the other of the handles and sometimes both. Which handle or handles to operate is rather difficult to remember. This is because there are 10 different speed stages and one must also consider whether he is shifting up or down, and the matter is further complicated by the fact that it is rather difficult for the bike rider to instantaneously determine what speed or gear stage he is in at that particular moment.

In my invention the above briefly described and other disadvantages of the prior art are overcome by providing a single manual operator which controls all 10 speeds, and in addition there is instantaneous indication of what speed the bike is then in or going into.

Figure 1:
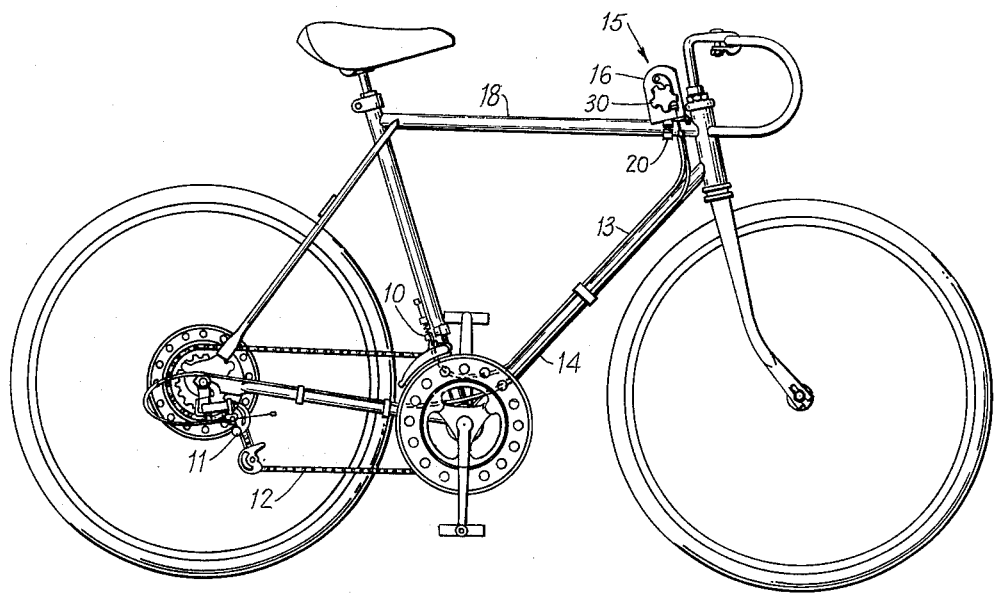
Figure 2:
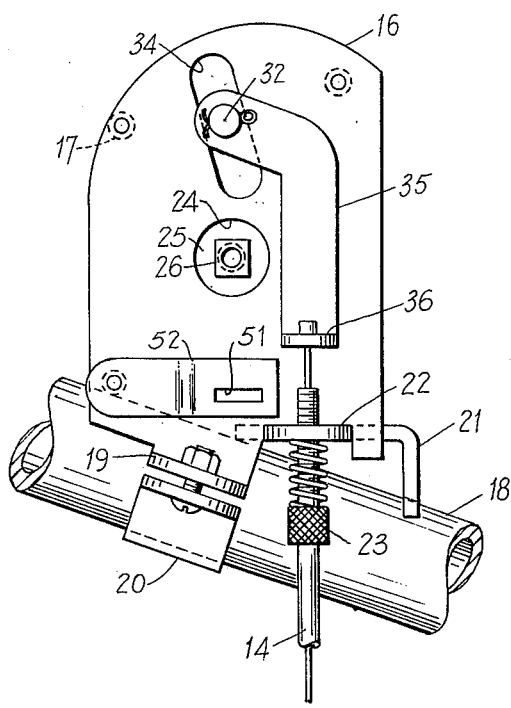
Figure 3:
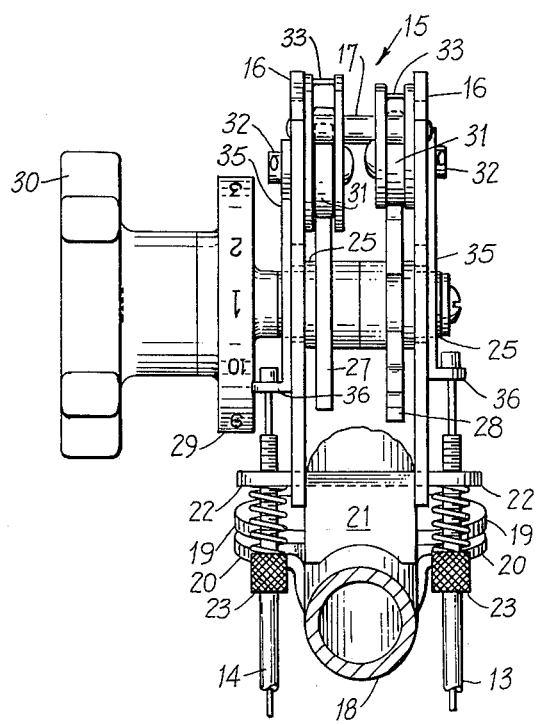
Figure 4:
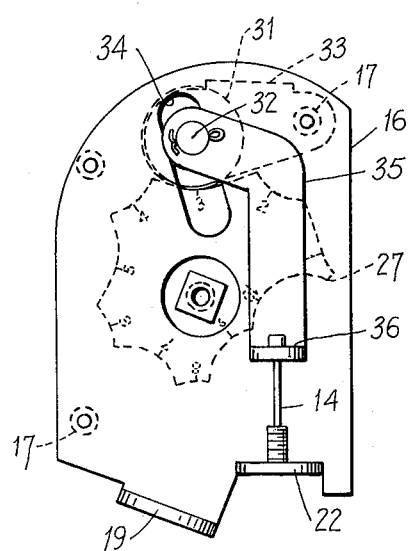
Figure 5:
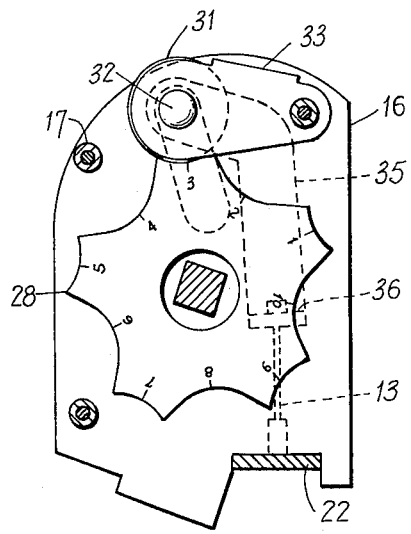
Figure 6:
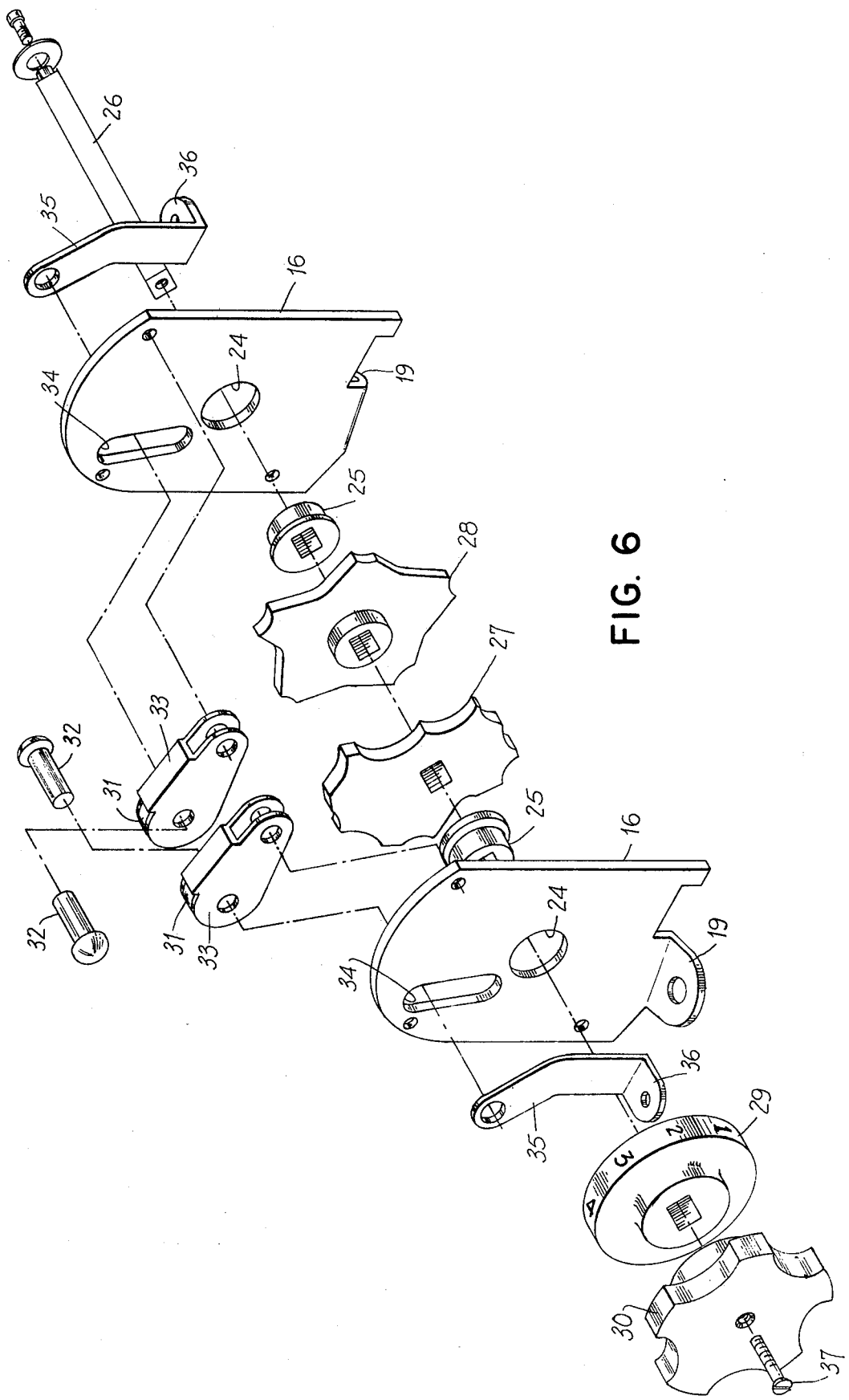
Figure 7:
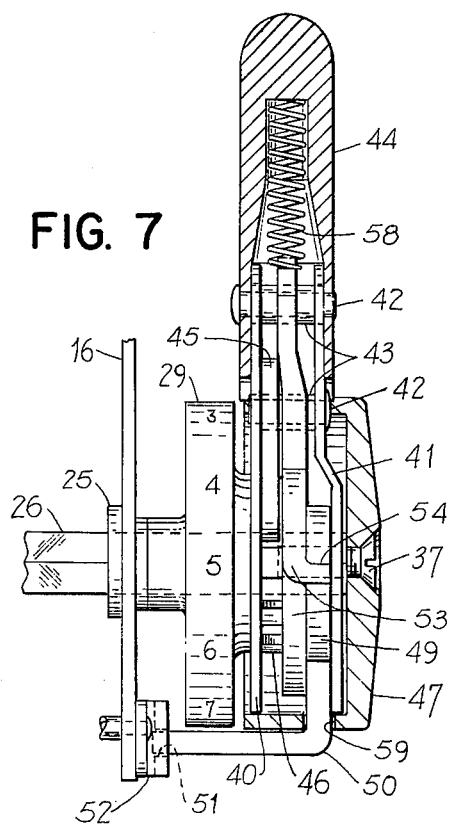
Figure 8:
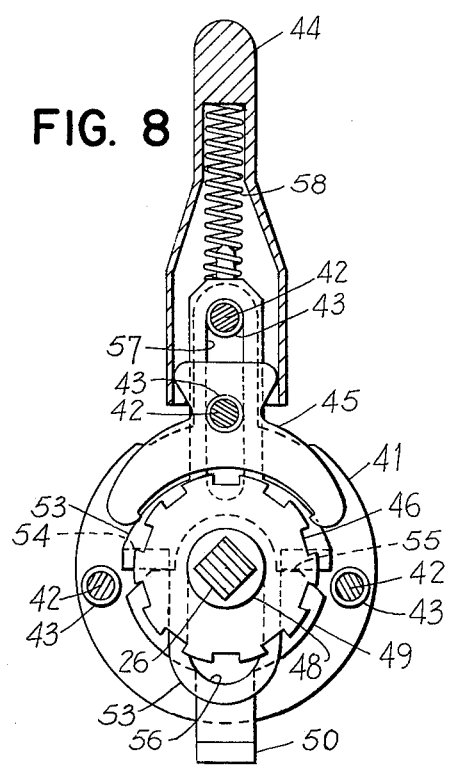
Figure 9:
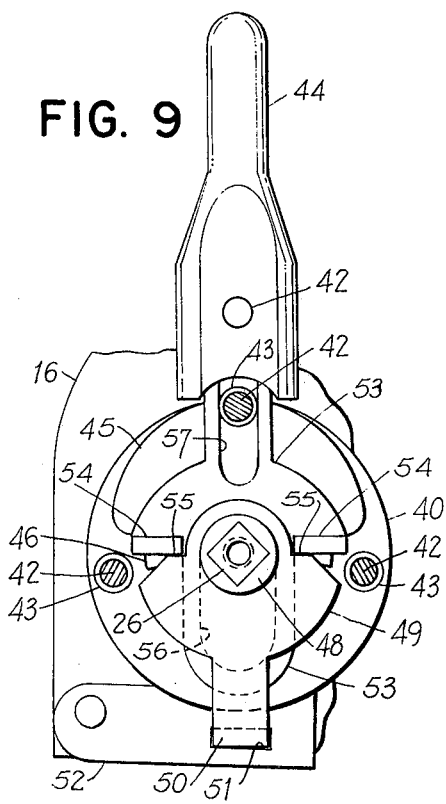

The invention will be better understood by considering the embodiment thereof shown in the attached four sheets of drawings in which FIG. 1 is a side view of a 10-speed bicycle incorporating the invention, FIG. 2 is a broken away left side view of the improved single control for all 10 speeds, FIG. 3 is a front view of the control, FIG. 4 is a view similar to FIG. 2 but to better show the control cam 27 for the rear derailleur mechanism, FIG. 5 is another similar view to better show the control cam 28 for the front derailleur mechanism, FIG. 6 is an exploded view of the operating mechanism of the single control;

and FIGS. 7–9 are various views of a modification in which a ratchet hand lever is substituted for the rotary hand knob of the single control in which FIG. 7 is a rear broken away view, FIG. 8 is a broken away view from the left of FIG. 7, and FIG. 9 is a broken away view from the right of FIG. 7.

Referring now first to FIG. 1, shown therein is a conventional 10-speed bicycle or bike having a front derailleur mechanism 10 and a rear derailleur mechanism 11. As is well known in the art, the front mechanism 10 shifts the sprocket chain 12 to either of two not shown front sprocket wheels, and the rear mechanism 11 shifts the chain 12 to either of five not shown rear sprocket wheels. In the prior art this is done by a pair of not shown hand shift levers on the handlebar or bike frame, one hand lever serving to pull or release a cable 13 extending to the derailleur 10 the requisite amount and the other not shown hand lever, the cable 14 for the derailleur 11. In the invention, a single manual controller, indicated generally by the reference numeral 15, does this for both cables 13 and 14. That is to say, the single control 15 covers all ten speeds of the bike. This single control will now be particularly described by reference to FIGS. 2–6.

As shown in FIGS. 2–6, the single control 15 comprises a pair of side plates 16 which are held in spaced relationship by a plurality of spacers 17 and pins therefor. The side plates 16 house the operating mechanism of the single control and mount the same on the top bar 18 of the bike, although the device could also be mounted on the handlebar or other part of the bicycle.

The control is mounted on the top bar 18 by virtue of ears 19 on the lower ends of the side plates 16 and a clamp 20 secured to the ears 19. In mounted position of the controller on top bar 18, the rear lower one of the spacers 17 rests on the top bar 18. An L-shaped member 21 is positioned between the lower front ends of the side plates 16. Opposite ends of the L-shaped member 21 rest on the top bar 18. The L-shaped member 21 has a pair of apertured ears 22 which protrude from the side plates 16. The ends of the cables 13 and 14, remote from the derailleurs 10 and 11, are connected to the controller at the ears 22. Actually, the cables 13 and 14 comprise an inner wire and an outer sheath, and they are connected to the ears 22 by adjustable connectors 23.

The operating mechanism of the single controller 15 will now be described. Each of the side plates 16 has a central aperature 24. Flanged bearings 25 having square holes are positioned in apertures 24. Extending through the bearings 25 is a cam shaft 26 having a square cross section. Mounted on shaft 26 between the bearings 25 are two 10 station or position cams 27 and 28. The 10 stations or positions for the two cams 27 and 28 are indicated by the numerals 1–10 on the cams shown in FIGS. 4 and 5 respectively. The cam 27 is the "rear" cam corresponding to the rear derailleur 11 for pulling or relaxing its cable 14 the requisite amount for all 10 speed stages, and the cam 28 is the "front" cam corresponding to the front derailleur 10 for pulling or releasing its cable 13 the requisite amount for all 10 speeds.

The cams 27 and 28 have square central holes for receiving the shaft 26. Also, the inner faces of the cams have bosses at the holes. These bosses and the flanges on the bearings 25 keep the two cams spaced from each other and the side plates, see FIG. 3.

The shaft 26 protrudes beyond the left side plate 16, see FIG. 3, and first an indicator wheel 29 and then a knob 30 are mounted at that end of the shaft. The indicator wheel 29 has numerals 1–10 thereon to indicate which of the 10 speeds or gear shift stages the bicycle is in. By comparing FIG. 3 with FIGS. 4 and 5, it will be seen that the position of the numerals on the wheel 29 correspond generally with that of the numerals on the two cams 27 and 28, although actually the wheel numerals are just slightly advanced with respect to those on the two cams. The position of the parts in FIGS. 3–5 correspond to speed or shift stage 3 of the 10 for the bike. With the type of handlebar shown in FIG. 1, the bike rider is bent over towards the handlebar. If he looks down at the wheel 29, with the position of the parts being as shown in FIGS. 3–5, the numeral on the wheel 29 facing him will be "3", which tells him that the bicycle is in the third speed or shift stage.

When the single manual control or knob 30 is rotated, the wheel 29 and the two cams 27 and 28 are rotated in unison. As the cams 27 and 28 are rotated in either direction, their stations 1–10, which are 36° apart, will sequentially engage a pair of cam follower mechanisms to pull or release each cable wire the requisite amount to operate the two derailleurs for all 10 speed or shift stages. The pair of cam follower mechanisms will now be described.

Each cam follower mechanism comprises a roller or wheel 31 which follows the contour of its respective cam 27 and 28. The cam follower wheel 31 is rotatably mounted on a pin 32 within the rear end of a generally U-shaped pivot arm or lever 33. Levers 33 are positioned between plates 16 and are pivoted at their front ends on the top front spacer 17. Thus, as the cams 27 and 28 are rotated, the levers 33 pivot up and down as the wheels 31 follow the contours of the cams. The pins 32 extend at their outer ends through the side plates 16 through elongated slots 34 in the side plates 16 and at their outermost ends are connected to the upper ends of generally L-shaped cable pull bars 35. The cable pull bars 35 slide on the outer surface of side plates 16 and the pins 32 move up and down in the slots 34 as the levers 33 pivot up and down as their rollers 31 follow the contours of cams 27 and 28. The lower ends of pull bars 35 have ears 36 formed thereon and the ends of the cable wires 13 and 14 are anchored to the ears 36. Thus, the pull bars 35 are raised and lowered to pull or release the cables slightly as the rollers 31 ride on the rises and dwells of the contoured cams 27 and 28. The cam follower rollers 31 are maintained in contact with the cams by the spring action of the standard derailleurs 10 and 11 acting through the cables 13 and 14. The cams are contoured so as to give the cables that amount of pull or release which is needed to permit the derailleurs to make their needed movement on the ends of the chain 12 for each of the 10 speed or sprocket gear stages of the bike. The amount of cable pull or release is readily determinable by those skilled in the art since derailleur mechanisms are old and well-known in the art. The derailleur mechanisms work automatically as the cables are pulled or released as the cyclist continues to pedal the bike. The invention utilizes conventional derailleur mechanisms and requires no change therein to achieve the advantages of the invention. Those advantages are a single manual control for numerically selecting and initiating each speed shift for the bicycle with no confusion whatsoever, since at all times there is an automatic read out of the speed stage that the bicycle is in and going into. Of course, the single controller is relatively uncomplicated and is easy to use because the single controller requires no complicated multiple movements. That is to say, to shift from one speed to another it is only necessary to rotate the knob in one direction or the other. That is to say, in order to make a shift there is only the one kind of same movement required, and that is to turn the knob. The only limitation that the single controller has is that it cannot be operated directly from the 10th speed back to the first speed. This is because of the steepness of the cam 27 curvature at its tenth position. However, one can go directly from first speed to 10th speed, and also from one speed to another speed in either direction and either slowly, one speed stage at a time or rapidly, so as to "jump" intermediate speed or gear stages.

In the embodiment of FIGS. 7-9 wherein a single hand ratchet lever is substituted for the continuously rotatable knob 30, the same advantages are provided, except that it is not possible to "jump" intermediate speed stages because the user simply cannot shift as fast. This is due to the nature of ratchets which must be worked back and forth, so the speed changes are progressive. However, this type of arrangement may be preferred by some bicyclists. Briefly, to change from the single knob embodiment to the single ratchet arrangement all that is necessary is to unscrew the stud 37, see FIG. 6, and remove the knob 30 and substitute the self-contained assembly of FIGS. 7-9 therefor and put the stud 37 back.

The single ratchet lever assembly will now be described, and comprises a back plate 40 and a front plate 41 which are connected together in spaced relationship by four pins and spacer sleeves 42 and 43, respectively. The uppermost pin also mounts a hollow handle 44 to the upper ends of the back and front plates 40, 41. A ratchet pawl 45 is mounted on the sleeve 43 which is on the pin 42 immediately below the uppermost pin 42 for the handle. Positioned immediately below the pawl 45 is a toothed wheel ratchet 46. The ratchet 46 is mounted on the square shaft 26 which extends through the assembly to a cup-shaped assembly cover 47. Cover cup 47 is connected to the outer end of shaft 26 by the previously mentioned screw 37 for the knob 30. The ratchet 46 has a square central hole which receives the shaft 26. The square central hole in ratchet 46 is surrounded by cylindrical front and rear bearing portions 48 which enter corresponding holes in the side plates 40, 41. The ratchet 46 and the overhanging pawl 45 are positioned against the inside of the back plate 40.

Positioned against the inside of the front plate 41 is a stationary centering member 49. It is mounted on the ratchet front bearing portion 48 and has a depending and rearwardly directed L-shaped portion 50. The outer extremity of the L-shaped portion 50 enter a slot 51 formed on the end of a finger 52 which is pivoted on the outside of one of the plates 16, see also FIG. 2.

Positioned between the pawl and ratchet 45, 46 and the stationary centering member 49 is a movable centering member 53. It has a semi-circular central portion having two forwardly bent ears 54 which engage two shoulders 55 formed on the stationary centering member 49. Movable centering member 53 also has a depending portion containing an elongated closed slot 56, and an upper portion which extends into the hollow handle 44 and has an elongated closed slot 57. The two upper pins and their sleeves 42, 43 are positioned in the upper slot 57 and the ratchet front bearing portion 48 is positioned in the lower slot 56. A compression spring 58 inside the handle 44 continuously biases the movable centering member 53 down so that the ears 54 on the movable centering member 53 will engage the shoulders 55 on the stationary centering member 49.

The operation of the device will now be described. When the handle 44 is pushed or pulled to rotate the shaft 26, the whole ratchet handle assembly rotates with the shaft 26 one cam station or 36°, is then stopped, and when released, returns to center position, and can then be moved again another cam station or 36°. The only part of the ratchet handle assembly that does not turn with the shaft 26 is the stationary centering member 49 since it is locked in fixed position by virtue of the fact that the tip of its L-shaped part 50 is positioned in the slot 51 of the finger 52 on side plate 16. So, everything moves relative the stationary centering member 49 including the cup 47. The cup has an elongated slot 59 in its bottom portion which extends for about 36 degrees to either side of the L-shaped part 50.

When the handle 44 is first pushed or pulled, it rocks slightly about the upper pin 42. When the handle 44 rocks, its bottom portion engages one or the other of the contiguous upper edges of the pawl 45 to rock the pawl, so that one or the other of its teeth engages one of the teeth on the ratchet 46. Therefore, as the handle continues to be pushed or pulled, the whole assembly, exclusive of the stationary centering member 49, turns with the shaft 26. Movable centering member 53 turns, too, even though its ears 54 are bottomed on the shoulders 55 of stationary centering member 49 because its slots 56, 57 permit it to be lifted. Since it can lift as it turns, one set of shoulders and ears 55, 54 stays in engagement, whereas the other set separates. By the time the assembly and shaft 26 have rotated 36°, or one numeral on the indicator wheel 29, the movable centering member 53 will have been lifted so the bottom edge of its slot 57 engages the sleeve 43 on the pawl pin 42 so that it can be lifted no more. Since it cannot be lifted any more, rotation of the assembly and shaft 26 is arrested. When the member 53 was being lifted, the spring 58 was being compressed. So, if the handle is now released, the spring will expand to drive the member 53 down, and for member 53 to move down it must rotate in the opposite direction and as it does this, it carries the whole assembly back to start position wherein both ears are bottomed on shoulders 55. When the handle is manually released, the compressed spring 58 also straightens up the handle with respect to the upper end of the pawl 45 so that it becomes disengaged from the ratchet 46 so that the shaft 26 and ratchet 46 stay in advanced position as the assembly returns to start position. When the assembly is being advanced, it turns with the shaft 26 and ratchet 46. When it is being returned to start position, it turns on the bearing portions 48 of the advanced ratchet 46. When the shaft 26 is advanced by the engaged pawl and ratchet, the indicator 29, of course, is advanced too, to indicate the new speed or gear stage.

The illustrated embodiment of the invention has been described in connection with a 26 inch wheel size bicycle in which the two front sprockets at the pedal axis have 46 and 52 teeth, the outermost sprocket being the 52 tooth one, and the five sprockets at the rear wheel axis have 32, 26, 21, 17, and 14 teeth, the rear sprockets being arranged from innermost to outermost in that order. In the 1 to 10 cam 27, 28 and indicator 29 positions, the chain 12 was moved by SUN TOUR brand derailleur mechanisms 10, 11 to different pairs of front and rear sprockets in the following order:

| Position | Front & Rear Sprockets |
| --- | --- |
| 1 | 46, 32 |
| 2 | 52, 32 |
| 3 | 46, 26 |
| 4 | 52, 26 |
| 5 | 46, 21 |
| 6 | 52, 21 |

-continued

| Position | Front & Rear Sprockets |
| --- | --- |
| 7 | 46, 17 |
| 8 | 52, 17 |
| 9 | 46, 14 |
| 10 | 52, 14 |

Thus, the particular illustrated contour of cams 27, 28 is for this sequence of chain 12 movement. However, it will be appreciated by those skilled in the art that the invention is not restricted to this particular sequence of chain movement and therefore cam contour, but is merely illustrative of the invention.

I claim:

1. In a 10-speed bike having front and rear derailleur mechanisms, and a pair of movable cables connected at one of their ends to different ones of said mechanisms for controlling the same, the improvement of a single manual control for all 10 speeds of said bike, said improvement comprising a pair of 10-station cams mounted on a common shaft, a pair of cam follower mechanisms engaged with said cams and having the other ends of said cables connected thereto, and a single manual member for rotating said shaft to move said cams in unison, and an indicator for all 10 speeds of said bike.

2. In a 10-speed bike as in claim 1, said single manual member comprising a knob on said shaft for rotating said shaft in either direction, and said indicator comprising a wheel on said shaft having the numerals 1 through 10 thereon.

3. In a 10-speed bike as in claim 1, said single manual member comprising a ratchet lever on said shaft for rotating said shaft in either direction, and said indicator comprising a wheel on said shaft having the numerals 1 through 10 thereon.

4. In a 10-speed bike as in claim 1, said single manual member comprising a manual operator on said shaft, said indicator comprising a dial wheel on said shaft having the numerals 1 through 10 thereon, and said single manual control comprising a unitary subassembly of said cams, shaft, cam follower mechanisms, operator and dial wheel, said subassembly being mounted at the front end of said bike.

* * * * *